Figure 1:
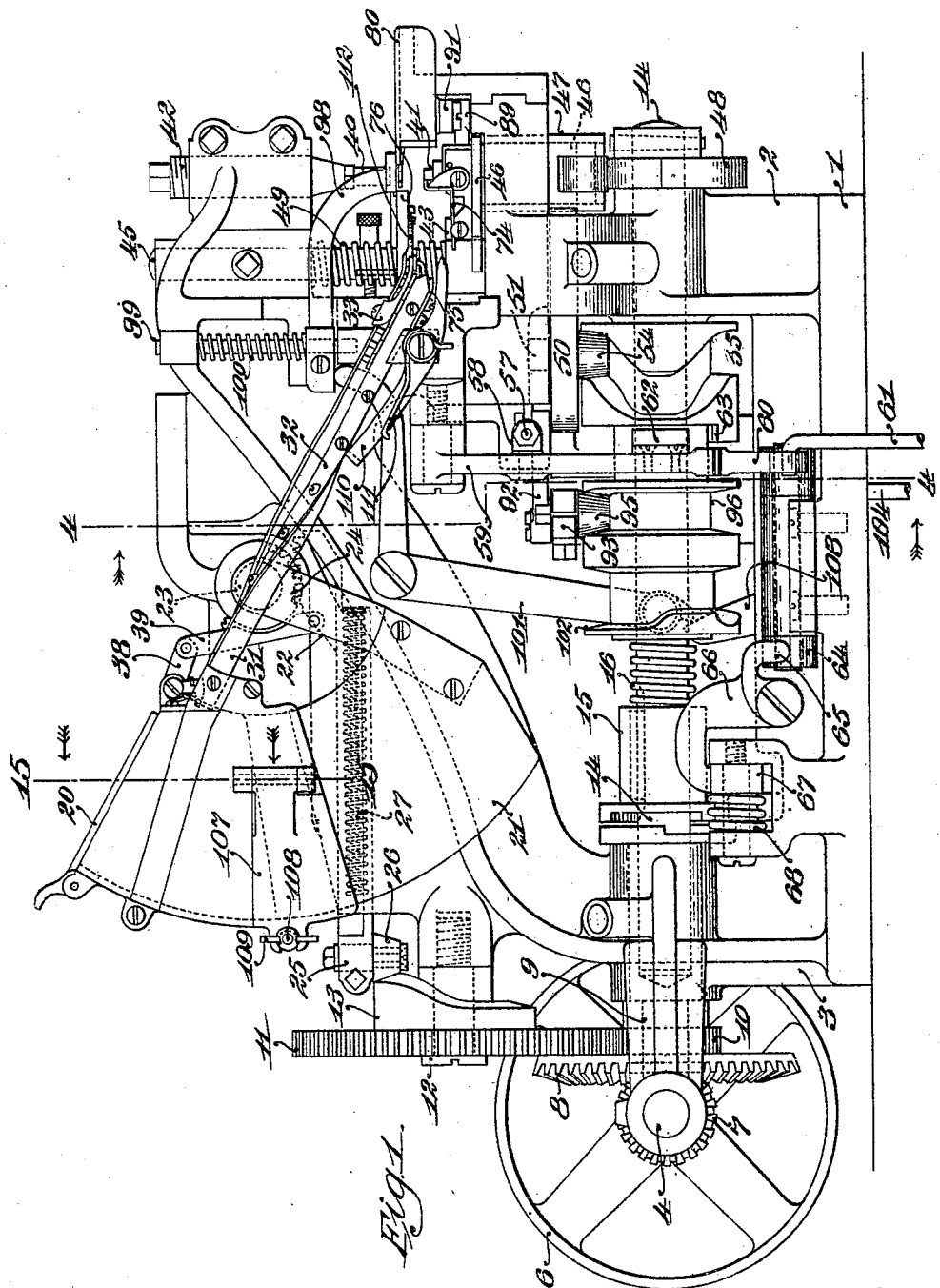

H. H. EATON.
MACHINE FOR SETTING LACING HOOKS OR STUDS.
APPLICATION FILED JULY 31, 1903.

936,431.

Patented Oct. 12, 1909.

7 SHEETS—SHEET 4.

Witnesses
Edward S. Day
Farnum F. Dorsey

Inventor
Harrison H. Eaton
by his Attorneys
Phillips Van Everen & Fish

H. H. EATON.
MACHINE FOR SETTING LACING HOOKS OR STUDS.
APPLICATION FILED JULY 31, 1903.
936,431.
Patented Oct. 12, 1909.
7 SHEETS—SHEET 5.
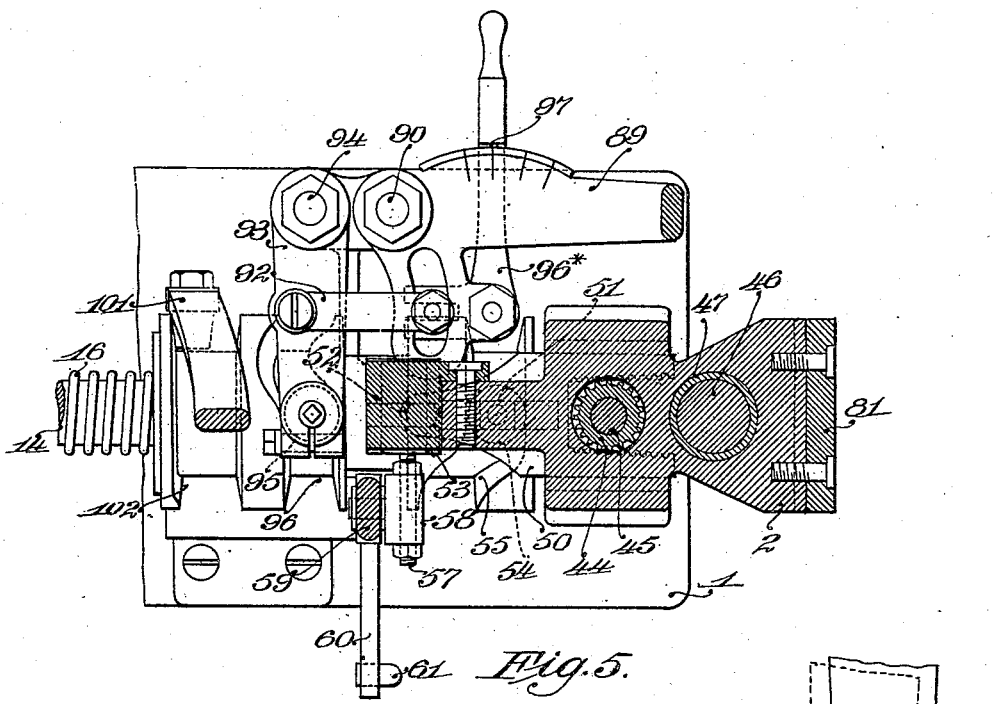
Fig. 5.
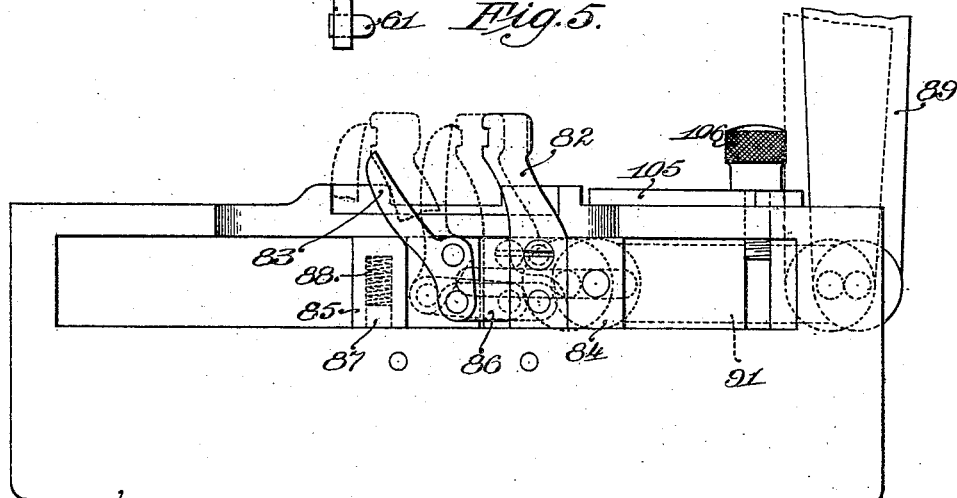
Fig. 6.
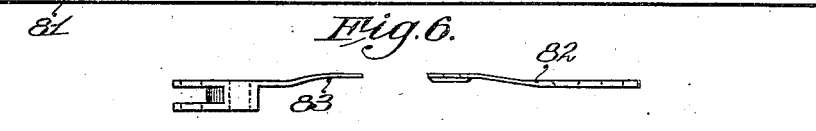
Fig. 7.
Fig. 8.
Witnesses
Edward S. Day
Farnum F. Dorsey
Inventor
Harrison H. Eaton
by his Attorneys
Phillips Van Everen & Fish

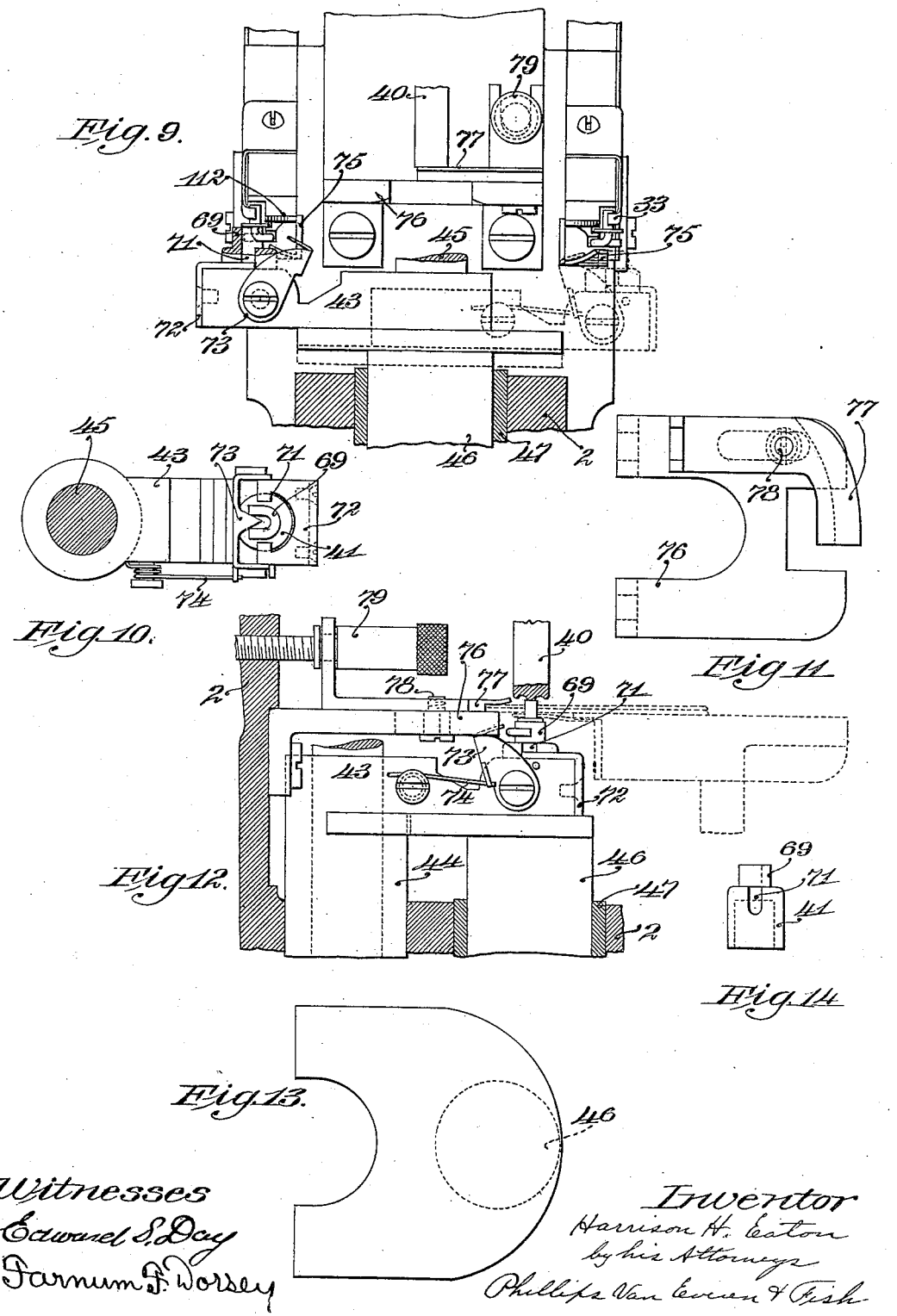

H. H. EATON.
MACHINE FOR SETTING LACING HOOKS OR STUDS.
APPLICATION FILED JULY 31, 1903.

936,431.

Patented Oct. 12, 1909.
7 SHEETS—SHEET 7.

Witnesses
Edward S. Day
Farnum F. Dorsey

Inventor
Harrison H. Eaton
by his Attorneys
Phillips Van Everen & Fish

UNITED STATES PATENT OFFICE.

HARRISON H. EATON, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR SETTING LACING HOOKS OR STUDS.

936,431.  Specification of Letters Patent.  Patented Oct. 12, 1909.

Application filed July 31, 1903. Serial No. 167,671.

*To all whom it may concern:*

Be it known that I, HARRISON H. EATON, a citizen of the United States, residing at Winchester, in the county of Middlesex and State of Massachusetts, have invented certain new and useful Improvements in Machines for Setting Lacing Hooks or Studs; and I do hereby declare the following to be a full, clear, and exact description of the invention, such as will enable others skilled in the art to which it appertains to make and use the same.

The present invention relates to machines for setting lacing hooks or studs and similar articles.

The general object of the invention is to simplify and improve the construction and improve the operation of machines of the class referred to.

The machine in which I have embodied the present invention is designed as an improvement on the machine disclosed in my prior patent for a machine for fastening lacing hooks in shoes, No. 719,314, dated January 27, 1903. The machine disclosed in said patent is constructed to set lacing hooks similar to those disclosed in my prior patent for an improved lacing hook for shoes, No. 11,874, reissued November 27, 1900. These hooks are of different shapes to adapt them to be secured upon opposite sides of the lacing slit of a shoe upper or other article, or are what are termed in the art right and left hooks. For setting these hooks the machine disclosed in said patent is provided with a single pair of dies constructed to set right and left hooks, two raceways located upon opposite sides of the dies, means for supplying one of the raceways with right hooks and the other raceway with left hooks, means for actuating one of the dies to take a hook from either raceway and carry it into a position to be acted upon by the dies, and means for relatively actuating the dies to set the hook. The machine is also provided with means for automatically feeding the work to space the hooks set therein the desired distance apart.

The machine in which I have embodied the present invention is provided with the instrumentalities above referred to and the various features of the invention relate to the mechanism for feeding the work, to the construction of one of the dies, to the means for supplying the raceways with hooks, and to certain other features of construction to be hereinafter referred to.

In accordance with my present invention a work feeding mechanism is provided which is arranged to coöperate with the hooks after being set to feed the work. This feeding mechanism as shown comprises a feed finger and means for actuating the same to engage a hook after being set and feed the work. It also comprises a finger coöperating with said feed finger to grasp a hook and hold it during the feeding movement. As shown both of these fingers have a to and fro movement in the line of feed and the finger which coöperates with the feed finger to grasp the hook also has a to and fro movement transversely to the line of feed in order to allow the finger to pass by the hook which was grasped to feed the work, during the backward movement of the fingers into a position to engage another hook.

Another feature of my invention contemplates yieldingly mounting the die which is moved to take a hook from one of the raceways, whereby said die is allowed to yield in case it encounters any obstruction, as, for instance, a hook which is not in proper position to be received by the die, and injury to the devices at the mouth of the raceway or other parts of the machine is avoided.

Another feature of my invention contemplates providing a holder for holding the hook in the die and providing means for actuating the holder to allow the hook to be received by the die.

Another feature of my invention contemplates providing clearing devices at the entrances of the raceways into the hopper and means for actuating the clearing devices to dislodge hooks at the entrances of the raceways, whereby the clogging of the entrances of the raceways by hooks which are improperly presented thereto is prevented. It is preferable that the mechanism for actuating the clearing devices should press the clearing devices yieldingly against the hooks in dislodging the hooks from the entrances of the raceways as thereby injury to the clearing devices, their actuating mechanism, or of the parts at the entrances of the raceways is prevented. To secure this result the clearing devices illustrated are yieldingly mounted by means of springs interposed between the clearing devices and their actuating mechanism.

In addition to the features of invention above referred to, my invention also contemplates providing certain improved constructions and arrangement of parts hereinafter described and claimed, the advantages of which will be obvious to those skilled in the art.

It is to be understood that while I have illustrated my invention as embodied in a machine for setting right and left lacing hooks, certain features thereof are not limited thereto but are equally capable of embodiment in machines for setting lacing hooks which are not rights and lefts or in machines for setting other forms of lacing hooks or studs or similar fasteners. It is also to be understood that the various features of my invention are not limited to any particular construction or arrangement of parts except where such limitations are expressly stated in the claims.

Figure 2:
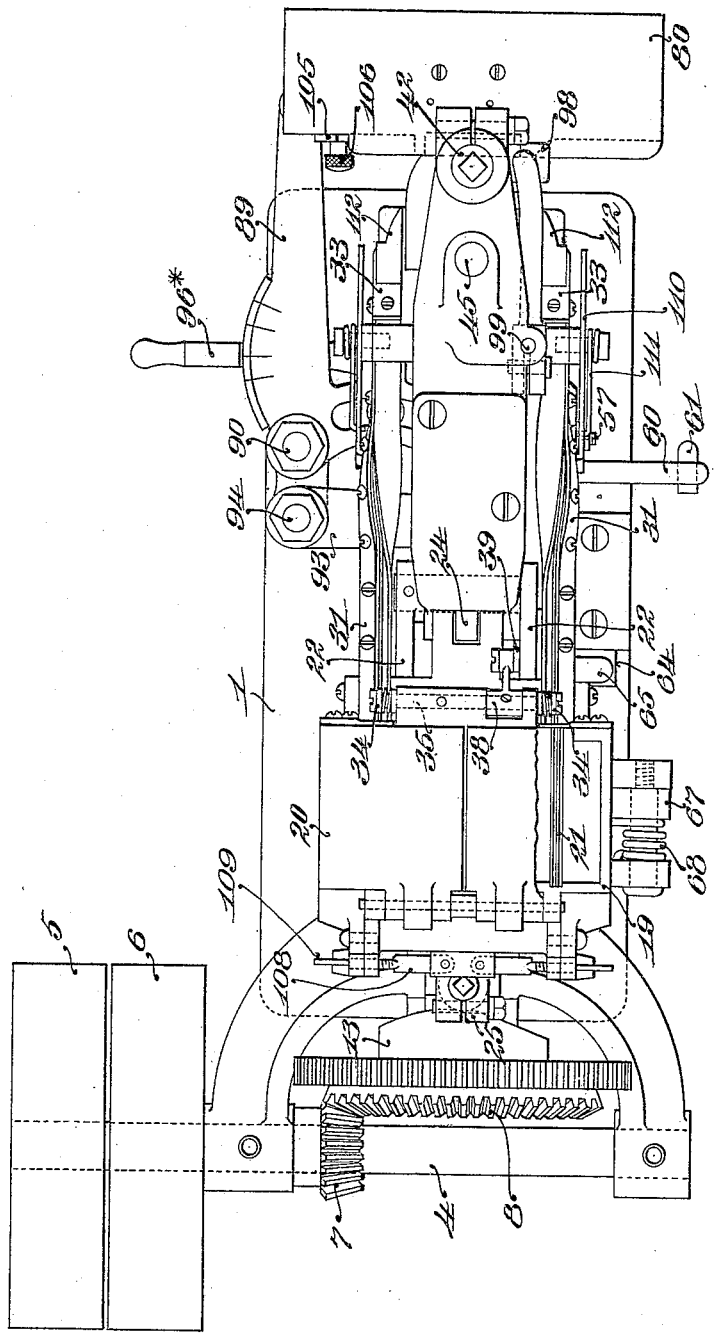
Figure 3:
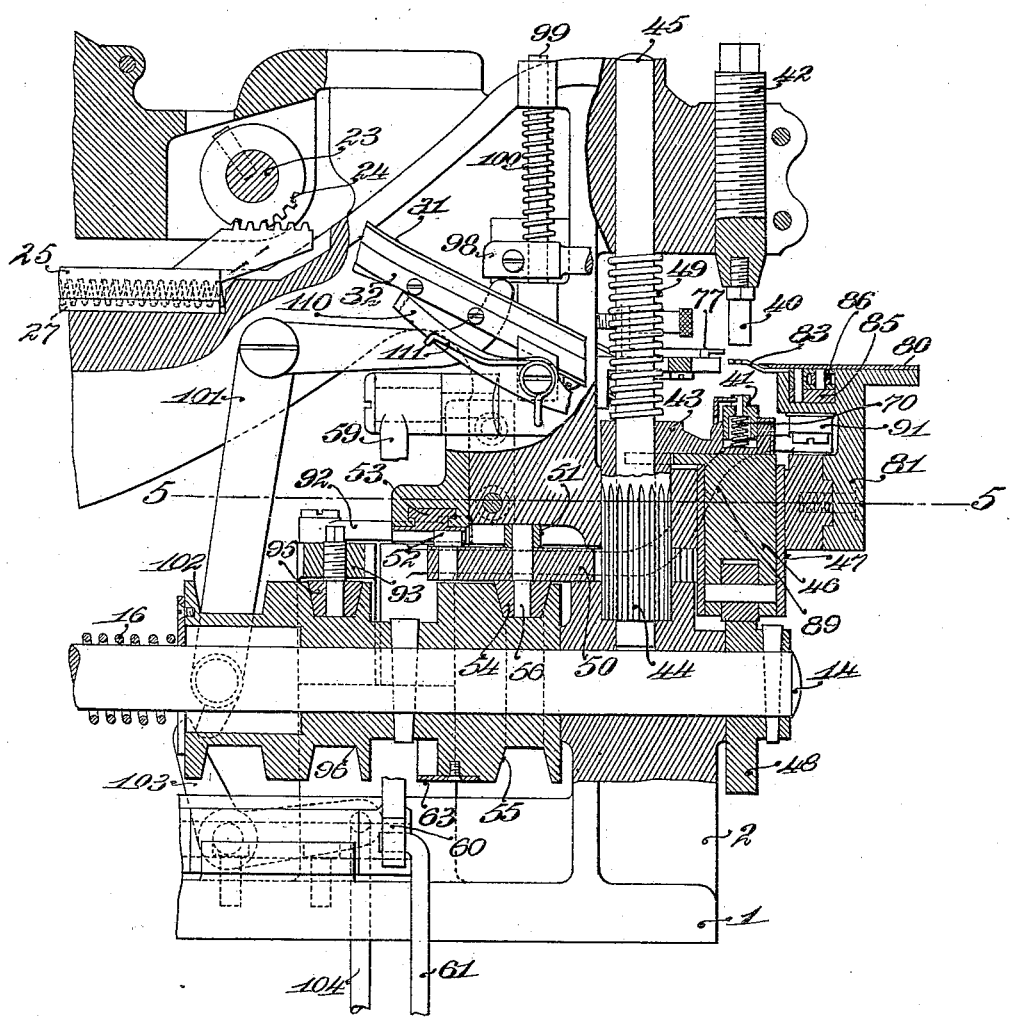
Figure 4:
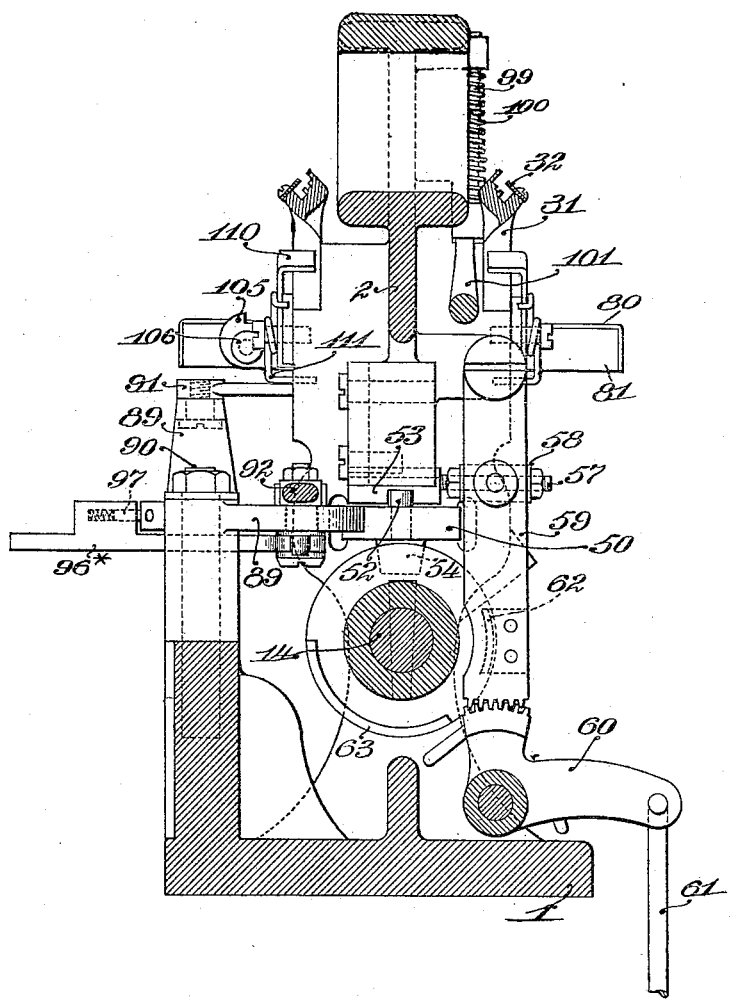
Figures 15, 16:
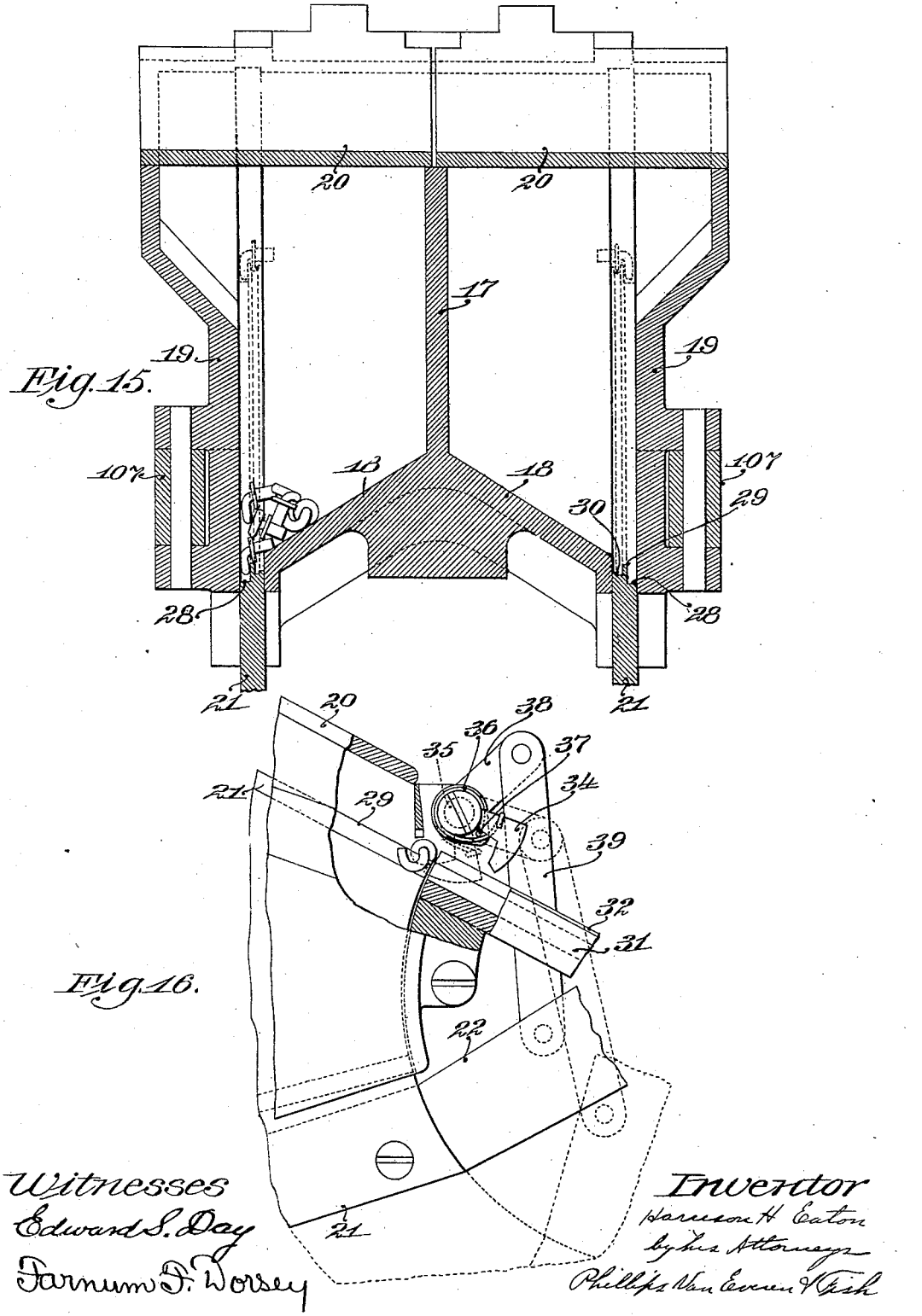

Referring now to the drawings accompanying this application in which is illustrated a hook setting machine embodying the various features of my invention in the best form at present known to me, Figure 1 is a view in side elevation of the machine; Fig. 2 is a plan view thereof; Fig. 3 is a central longitudinal section of the front portion of the machine; Fig. 4 is a cross-sectional view taken on the line 4—4 of Fig. 1 looking toward the front of the machine; Fig. 5 is a sectional plan view of the front portion of the machine taken on the line 5—5 of Fig. 3; Fig. 6 is a detail plan view illustrating the construction and mode of operation of the feeding mechanism, the work supporting plate being removed; Fig. 7 is a view in side elevation of the four-motion feed finger and the slide upon which it is pivoted, said parts being shown separated in the figure; Fig. 8 is a similar view of the two-motion feed finger and the slide to which it is secured; Fig. 9 is a detail view in front elevation partly in section of the setting dies and the parts adjacent thereto, the lower die being shown in full lines in the position which it assumes in taking a hook from one of the raceways and in dotted lines in the position which it assumes in taking a hook from the other raceway; Fig. 10 is a detail plan view of the lower die, the die carrier and the parts supported thereby; Fig. 11 is a detail plan view of the plate which supports the inner edge of the work and the adjustable edge guide mounted thereon; Fig. 12 is a detail sectional view illustrating the position which the lower die and the parts associated therewith assume during the operation of setting a hook; Fig. 13 is a detail plan view of the plunger upon which the carrier for the lower die is supported; Fig. 14 is a view in side elevation of the lower die; Fig. 15 is a detail sectional view taken on the line 15—15 of Fig. 1, looking toward the rear of the machine, and Fig. 16 is a detail view illustrating the clearer at the entrance of one of the raceways, and the mechanism for actuating the same, a portion of the hopper being broken away to show underlying parts.

The frame of the machine consists of a base plate 1, a front standard 2 rising from the base plate comprising a base portion, an upper overhanging portion and a connecting rear portion, a rear standard 3 and a connecting portion connecting the upper ends of the standards 2 and 3. Projecting rearwardly from the standard 3 are horizontal curved arms in the outer ends of which is journaled the main driving shaft 4 provided with the fast and loose belt pulleys 5 and 6 with the beveled gear 7. The beveled gear 7 meshes with a beveled gear 8 upon the rear end of a short horizontal shaft 9 journaled in bearings in the standard 3 at right angles to the driving shaft 4. To the shaft 9 is also secured a gear wheel 10 which meshes with a gear wheel 11 journaled upon a stud 12 above the shaft 9. A cam 13 is formed integral with the gear wheel 11 or is secured thereto and from this cam the hook lifting plates for delivering hooks to the raceways are actuated as will be hereinafter described.

The inner end of the shaft 9 is bored axially to form a bearing for the rear end of a cam shaft 14, the front end of which is journaled in a bearing in the standard 2. To this cam shaft are secured a series of cams from which the hook feeding and setting devices and the work feeding devices are actuated as will be hereinafter described. The inner end of the shaft 9 is provided with clutch projections with which clutch projections upon a sleeve 15 splined upon the shaft 14 are arranged to engage. The sleeve 15 is actuated in a direction to clutch the shaft 14 to the shaft 9 by means of a coiled spring 16 surrounding the shaft 14 and interposed between the end of the sleeve and one of the cams upon the shaft. The cam shaft 14 remains at rest so long as the shaft is disconnected from the shaft 9 and the mechanism hereinafter described for controlling the position of the sleeve 15 affords a means for throwing the cam shaft and thereby the hook feeding and setting mechanism and the mechanism for feeding the work into and out of operation during the continued operation of the hook lifting plates, which, as I have stated, are actuated from the cam 13 which is driven directly from the main driving shaft 4.

The hoppers into which the lacing hooks are placed loosely are located upon the upper rear portion of the machine frame. The shape of these hoppers is best illustrated in Fig. 15 in which it will be seen that they comprise a common vertical wall 17, inclined bottom walls 18 and outer side walls 19, the upper and lower portions of which are vertical and are connected by an inclined portion. Each hopper is provided with a cover plate 20 hinged to the rear edge of the hopper and with a door 107 hinged to the side wall of the hopper and arranged to close an opening in the rear lower portion of the outer side wall. The opening in the outer side wall of each hopper which is closed by a door 107 is so arranged with relation to the inclined bottom wall 18 of the hopper that when the door is opened the hooks which are in the hopper are discharged therefrom through the opening by gravity. The hooks which are in the hoppers can thus be readily discharged therefrom whenever it is desirable to change the quality or style of the hooks which are to be set by the machine. The doors 107 are held in closed position so as to form continuations of the side walls of the hoppers by means of latch bolts 108 (see more particularly Figs. 1 and 2) pivoted upon a lug at the rear of the hopper, the free ends of the latch bolts being arranged to engage slots in lugs projecting from the doors 107 and being provided with winged locking nuts 109. The hook lifting plates are indicated at 21. These plates are segmental in shape and are arranged to reciprocate through slots extending the entire length of the hoppers at the junction of the bottom walls 18 and side walls 19. Each of these plates is secured to an arm 22 rigidly connected to a rock shaft 23 journaled in the frame of the machine in front of the hoppers. A pinion 24 is secured to the shaft 23 with which meshes a series of rack teeth upon a slide 25 mounted to reciprocate in a guideway beneath the hoppers. A cam roll 26 mounted upon the rear end of the slide 25 is pressed into engagement with the cam 13 by means of a coiled spring 27, the construction being such that during the rotation of the cam 13 the slide 25 is reciprocated and thereby the shaft 23 is oscillated to raise and lower the plates 21.

As is clearly shown in Fig. 15 the upper edge of each plate 21 is provided with a ledge 28, with a projecting rib 29 and with a groove 30. When the plates 21 are in their uppermost position the upper edges of the plates are inclined from the rear toward the front of the hoppers and are in line with the entrances of the raceways. During the upward movement of the plates, the plates pass through the mass of hooks in the hoppers and certain of the hooks are engaged by the plates as indicated in dotted lines in Fig. 15 and are raised into a position to be delivered to the raceways. The body portions of the hooks which are lifted by the plates rest upon the ledges 28 and the collars of the hooks enter the grooves 30, the ribs 29 extending into the spaces between the body portions of the hooks and the collars or bases of the hooks. The ledges 28 compel the hooks to assume a certain angular position. The hooks are thus supported in a position to enter the raceways as they slide down the inclined upper edges of the hook lifting plates. The positions which a hook assumes in passing down the upper edge of a hook lifting plate into a raceway are illustrated in Fig. 16.

Extending from each hopper to one side of and to the rear of the setting dies is a raceway 31. This raceway consists of a bar suitably grooved, as is most clearly shown in Fig. 4, to support and guide the hooks. To the bar is secured a plate 32 which forms a support and guide for the collars of the hooks which are also supported and guided by a groove in the bar. The hooks slide down the raceway and the mouth of the raceway is arranged to present a hook with its body portion in position to be received by the lower setting die. The lowermost hook in the guideway is held in position by the groove which engages the collar of the hook and by a leaf spring 33 which engages the shank of the hook (see more particularly Figs. 1 and 9).

At the entrance of each of the raceways into the hoppers a clearing device 34 is located. These clearing devices consist of arms loosely mounted upon a shaft 35 journaled in bearings upon the front of the hoppers. Each arm is connected to the shaft by means of a coiled spring 36, one end of which is connected to the arm and the other end to the shaft or a flange formed thereon. The movement of each arm with relation to the shaft under the force of the spring is limited by a stop pin 37 projecting from a flange on the shaft. Secured to the shaft 35 is an arm 38 which is connected by means of a link 39 to one of the arms 22 to which the hook lifting plates are secured. The clearing devices are thus oscillated each time the hook lifting plates are raised and lowered. Each clearing device is arranged to move through the entrance of a raceway into the hopper and to dislodge any hook which may have been left at the entrance of the raceway. In case a hook is firmly wedged at the entrance of the raceway the clearing device is allowed to yield by reason of its spring connection with the shaft 35 and thereby any injury to the clearing device, its actuating mechanism or to the parts of the machine adjacent to the entrance of the raceway is prevented.

The dies for setting the hooks consist of a stationary upper die 40 and a movable lower die 41. The upper die is secured in the lower end of a rod 42 having a screw-threaded engagement with a split clamp formed in the upper overhanging portion of the standard 2 of the machine frame. The upper die 40 is thus mounted so as to be capable of adjustment toward and from the lower die to bring it into the desired position. The lower die is moved toward and from the upper die to set a hook and is also moved to take a hook from either raceway. For imparting these movements to the lower die mechanism is provided which may be described as follows:—The lower die is mounted in a die carrier comprising an arm 43 projecting laterally from a sleeve 44 mounted to rotate and reciprocate upon a vertical shaft 45 secured at its upper and lower ends in the overhanging portion and in the base portion of the standard 2. The arm 43 of the die carrier rests upon a plate secured to or formed integral with the upper end of a plunger 46 mounted to reciprocate in a vertical bushing 47 secured in the base portion of the standard 2. The lower end of the plunger 46 is provided with a roller which rests upon a cam 48 secured to the forward end of the cam shaft 14. A coiled spring 49 surrounds the shaft 45 and is interposed between the overhanging portion of the standard 2 and the die carrier. The spring 49 holds the carrier in contact with the plunger 46 and presses the plunger toward the cam 48, the construction being such that the plunger 46 and the die carrier are positively raised by the cam 48 to move the lower die toward the upper die and are returned to their lowest position by means of the spring 49. The die carrier is actuated to move the lower die toward and from either raceway by means of a forked slide or yoke 50, the arms of which extend upon opposite sides of the sleeve 44 and are provided with rack teeth adapted to mesh with gear teeth formed on the sleeve. The slide 50 is mounted in the base portion of the standard 2 and is provided with a rectangular guiding block 51 rotatably mounted upon a stud secured to the slide and with a guiding stud 52. The guiding block 51 is received in a guideway in the standard 2 and the guiding stud 52 is received in a guideway in a slide 53 mounted to reciprocate in guideways formed in a block secured to the standard 2. The slide 50 is also provided with a roller 54 which engages a cam groove 55 of a cam secured to the cam shaft 14. The slide 50 is thus reciprocated by means of the cam groove 55 and the die carrier is oscillated to move the lower die toward and from one of the raceways. The raceway toward and from which the lower die is moved depends upon which of the racks upon the slide 50 is in mesh with the gear teeth of the sleeve 44. In order to bring either rack into mesh with the gear teeth on the sleeve 44 the slide 53 is moved in one direction or the other, thereby swinging the slide 50 about the axis of the stud 56 upon which the block 51 and roll 54 are mounted. The slide 53 is adjustably connected by means of a screw-threaded rod 57 (see Figs. 1, 4 and 5) to a block 58 pivotally mounted upon a lever 59. The lever 59 is pivoted at its upper end to the standard 2 and is provided at its lower end with gear teeth which are engaged by gear teeth upon the upper end of one arm of a bell crank 60, the other arm of which is connected by a rod 61 to a foot treadle. The lever 59 is moved by the operator through the bell crank 60 and rod 61 either to the right or to the left from the position indicated in Fig. 4 to cause one or the other of the racks upon the slide 50 to engage the teeth on the sleeve 44 of the die carrier. In order to insure the continued engagement of the rack with the teeth on the sleeve of the carrier during the reciprocation of the slide, the lever 59 is provided with a laterally extending segmental flange 62, which is arranged to engage either the outer or inner surface of a coöperating flange 63, upon a disk secured to the cam shaft 14, during that portion of the revolution of the cam shaft in which the slide 50 is reciprocated.

In the machine illustrated in the drawings the bell crank 60 and rod 61 are also utilized to actuate the mechanism which controls the position of the clutch sleeve 15. To this end the bell crank 60 is secured to one end of a short shaft journaled in a bearing on the base plate of the machine. From the other end of this shaft two arms 64 extend in opposite directions beneath the ends 65 of a fork or yoke forming one arm of a bent lever 66 pivotally mounted upon the base of the machine. The relative arrangement of the arms 64 and the ends 65 of the forked arm of the lever 66 is such that the forked end of the lever is raised, and its other end depressed, when the shaft is rocked by the movement of the bell crank 60 in either direction. The other end of the lever 66 rests upon a lever 67 pivotally mounted on the base of the machine and extending beneath the sleeve 15. The lever 67 is pressed toward the sleeve 15 by means of a coiled spring 68 surrounding its pivot and is provided with a cam surface adapted to engage a radially extending pin on the sleeve 15 and force the sleeve in a direction to disengage its clutch projections from the clutch projections on the shaft 9. Whenever the lever 67 is depressed by the actuation of the lever 66 as above described the cam surface on the lever is removed from engagement with the pin and the sleeve 15 is allowed to move toward the shaft 9, thereby clutching the cam shaft to the driving shaft and throwing the mechanism hereinbefore described for actuating the lower die into operation. The mechanism above described for controlling the position of the sleeve 15 will be readily understood from the description above given and from an inspection of Fig. 1, and inasmuch as certain parts of this mechanism are of old and well-known construction and in and of themselves form no part of my present invention, further description and illustration thereof is deemed unnecessary.

The shape and the relative arrangement of the cam groove 55 and the cam 48 are such that the die carrier for the lower die is first moved to bring the lower die beneath the hook at the mouth of one of the raceways, the die carrier when in this position being still supported by the plate at the upper end of the plunger 46. The plunger 46 is then raised to cause the lower die to engage the hook and the die carrier is thereafter moved to bring the lower die with the hook supported thereby into line with the upper die. The plunger 46 is then again raised to force the shank portion of the hook through the work and set the hook against the upper die.

The lower die is constructed to receive the body portion of the hook and to support the base portion of the hook during the setting operation. To this end it comprises a projection 69 provided with a surface at its upper end to support the collar of the hook and with a recess or slot at one side to receive the body portion of the hook which when the hook is on the die lies in this recess and extends around the projection 69.

In order to prevent injury to the die or to the parts at the mouth of the raceway in case a hook is not presented in proper position to be received by the die, the die is yieldingly supported upon the die carrier by means of a coiled spring 70 seated in a recess in the lower end of the die. The die is arranged to move in a vertical guideway in the die carrier and its upward movement is limited by means of lugs projecting into slots 71 in the sides of the die from a plate 72 secured to the end of the die carrier.

During the movement of the die carrier to move the lower die from one of the raceways to a position to coöperate with the upper die in setting the hook, the hook is held in the lower die by means of a holding device 73. This holding device is yoke-shaped and is pivoted to the arm 43 of the die carrier by means of pivot pins passing through the arms of the yoke. The part of the holding device which directly engages the hook consists of a triangular-shaped projection which is arranged to pass over that portion of the hook which extends around the projection 69 of the die. The holder is normally held in a position to hold the hook in the die by means of a spring 74 which is coiled around a stud projecting from the arm 43 of the die carrier, one end of the spring being secured to the die carrier and the other end engaging a projection on the holding device, as is clearly illustrated in Figs. 10 and 12. A cam plate 75 is secured to the lower end of each of the raceways in a position to be engaged by one of the arms of the holding device when the die carrier is moved to bring the lower die beneath the hook at the entrance of one of the raceways. The holding device is thus moved away from the die to allow the body portion of the hook to be received by the die during its upward movement. The holding device is moved still farther away from the die during the upward movement of the die, and as soon as the die carrier is moved to cause the die to take the hook from the raceway the spring 74 returns the holding device into a position to hold the hook in the die. The manner in which the holding device is actuated will be more clearly understood from an inspection of Fig. 9, in which the full lines at the left of the figure indicate the position which the holder assumes after the die has been raised to engage the hook and the dotted lines at the right of the figure indicate the position which the holder assumes when the die is in position beneath the hook but before it has been raised to engage the hook. The holding device is also actuated to allow the hook to be withdrawn from the die when the die descends after the hook is set, by engaging, during the upward movement of the die, the lower surface of the table 76 which supports the inner edge of the work. The manner in which the holding device is thus actuated will be apparent from an inspection of Fig. 12 which illustrates the position which the holding device assumes during the upward movement of the die.

The hooks slide down the raceways 31 under the force of gravity and in order to guard against clogging of the raceways two hammers are provided which are intermittently actuated to jar the raceways. These hammers are indicated at 110 and as shown each hammer consists of a lever pivotally mounted upon the frame of the machine beneath a raceway, one end of the lever being arranged to contact with the raceway and the other end extending into a position to be engaged by the plate 72 upon the end of the die carrier during the upward movement of the die carrier to bring the die into engagement with a hook in the raceway. The lever is normally held against the raceway by means of a spring 111. When the die carrier is raised to bring the die into engagement with a hook in the raceway the lever is swung against the tension of the spring 111 and as soon as the lever is released by the movement of the die carrier in carrying a hook away from the raceway, the lever is brought forcibly against the raceway by the spring 111, thereby jarring the raceway and dislodging any hooks which may become clogged therein.

During the first portion of the movement of the die carrier in carrying a hook from either raceway, the holding device 73 is out of engagement with the hook and in order to prevent the hook from being displaced during this portion of the movement of the die carrier a guide plate 112 is provided at the end of each raceway, the edge of which is curved and arranged to bear against the upwardly projecting shank portion of the hook in the die. This plate by engaging the shank portion of the hook presses on the hook laterally and holds the hook in position with its body portion in the recess or slot in the side of the projection 69 of the die until the holder 73 has been moved into engagement with the body portion of the hook.

The inner edge of the work is supported by a table 76 shown separately in Fig. 11. This table is secured to the standard 2 at the rear of the dies and is provided at its forward edge with an opening to receive the holding projection of the holding device 73 when the holding device is moved rearwardly during the upward movement of the lower die. An edge gage 77 is adjustably mounted upon the table 76 by means of a headed screw 78 passing through a slot in the table and screwing into the gage. The means for adjusting the gage consists of an adjusting screw 79 engaging an upturned flange at the rear end of the gage and screwing into the standard 2. At the front of the dies the work is supported by means of a work supporting plate 80 secured to the upper end of block 81 which is secured to the standard 2 and extends upwardly in front of the lower die.

The devices for feeding the work to space the hooks the desired distance apart comprise a feeding finger 82 and a coöperating finger 83 (see more particularly Figs. 6, 7 and 8). These fingers are so located that they are beneath the work supported upon the tables 80 and 76 and are arranged to grasp the body portion of a hook close to the base after it has been set in the work and to move while the hook is grasped in a direction to feed the work. The finger 82 is rigidly secured to a block 84 mounted to slide in a guideway formed in the upper surface of the block 81 beneath the table 80. The finger 83 is pivotally mounted upon a block 85 also mounted to reciprocate in the guideway in the upper surface of the block 81 and is connected by means of a link 86 to the block 84 to which the finger 82 is secured. The finger 82 is thus capable of a to and fro movement in the line of feed, these movements being imparted to the finger by the reciprocating movement of the block 84 in its guideway. The finger 83 is also capable of a to and fro movement in the line of feed due to the reciprocating movement of the block 85 in its guideway and a further to and fro movement transversely to the line of feed on account of its pivotal connection with the block 85. The block 84 is reciprocated in its guideway by mechanism actuated from the cam shaft 14 as will be hereinafter described and the block 85 is reciprocated through the link 86. The block 85 is frictionally mounted in its guideway by means of a pin 87 seated in a recess in the block 85 and pressed against the side of the guideway by means of a coiled spring 88.

The manner in which the fingers 82 and 83 operate will be clearly understood from an inspection of Fig. 6. Referring to this figure the full lines indicate the position which the fingers assume when at the end of their backward movement. As the block 84 is moved toward the left the finger 83 is swung toward the finger 82 as indicated in the first dotted line position, the block 85 being held from movement by the frictional engagement of the pin 87 with the side of the guideway. The body portion of a hook is thus grasped between the two fingers and thereafter both fingers are moved together in the line of feed to the second dotted line position. During the return movement of the finger 82 and block 84 the finger 83 is first moved away from the finger 82 so as not to contact with the hook during the return movement of the block 85 and is then returned to the position indicated in full lines in Fig. 6.

The mechanism for reciprocating the block 84 to which the finger 82 is secured is best illustrated in Figs. 3, 4, 5 and 6. Referring to these figures 89 indicates a bell crank lever pivotally mounted upon a vertical stud 90 at one side of the base of the machine. One arm of this lever projects toward the front of the machine and is bent upwardly and is connected at its forward end by means of a link 91 to the block 84. The link 91 extends beneath the portion of the block 81 in which the blocks 84 and 85 are mounted and the pin which connects the link to the block 84 passes through a slot in the block 81. The other arm of the bell crank lever 89 is connected by means of a link 92 to a lever 93 pivoted at one end to a vertical stud 94 adjacent the stud 90. A roll 95 is secured in the other end of the lever 93 and engages a cam groove 96 in a cam secured to the cam shaft 14. In order to provide a means for varying the extent of the movements imparted to the feeding fingers and consequently the distance between successive hooks set by the machine, the link 92 is pivotally connected to a block mounted in a segmental slot in the arm of lever 89. This block is engaged by one arm of an adjusting lever 96* pivotally mounted upon the lever 89. The other arm of the lever 96* is provided with a spring pressed pin 97 which is arranged to engage one of a series of holes of an index formed on or secured to the lever 89 and thus lock the lever 96 and the block to which the link 92 is connected in adjusted position.

In order to hold the work in position during the backward movement of the feeding fingers a presser foot 98 is provided. This presser foot is raised and lowered to allow the work to be fed and to hold the work during the return movement of the feeding fingers and is also raised and lowered to allow the work to rise toward the upper die during the operation of setting a hook and to depress the work and the upset end of the eyelet shank below the level of the face of the upper die prior to the feeding of the work. The presser foot 98 is secured to and carried by a vertically reciprocating rod 99 mounted in the upper portion of the standard 2. A coiled spring 100 surrounds the rod 99 and is interposed between the upper bearing for the rod and the presser foot, the tendency of the spring being to hold the presser foot down against the work. A bent lever 101 is pivoted to the frame of the machine and one end of this lever extends beneath the rear end of the presser foot 98. The other end of the lever 101 is provided with a roll which is engaged by a cam 102 secured to the cam shaft 14. The shape of the cam 102 and its arrangement with relation to the other operating cams and cam grooves are such that the presser foot 98 is raised and lowered at the proper times during the operation of the machine. As a means for raising the presser foot to allow work to be inserted in the machine a bent lever 103 is provided (see Fig. 3) one end of which is arranged to engage a projection from the lower end of the lever 101, and the other end of which is connected by a rod 104 to a foot treadle.

Briefly stated the operation of the machine above described is as follows:—The hook lifting plates are continuously actuated so long as the driving belt remains on the fast pulley of the main driving shaft. If a shoe upper is to be provided with lacing hooks the presser foot is raised from the work by depressing the treadle connected with the rod 104 and one side of the shoe upper is placed in position beneath the upper setting die. The bell crank 60 is then rocked in one direction or the other by means of the treadle connected to the rod 61. The rocking of the bell crank 60 connects the carrier of the lower die to its actuating mechanism so as to be swung toward and from the raceway containing the hooks adapted to be secured to the side of the upper which has been inserted in the machine. Simultaneously the cam shaft 14 is connected to the driving shaft so as to be rotated thereby. The lower setting die is moved to take a hook from the raceway and is then returned to a position directly beneath the upper setting die and is raised to force the shank of the hook through the work and against the face of the upper setting die. During the last portion of the upward movement of the lower setting die the presser foot rises to allow the work to be raised toward the upper die and the shank of the hook to be upset and pressed firmly against the surface of the work. The lower die then descends to its lowest position. During the first portion of the downward movement of the lower die the presser foot is brought down upon the work and presses it and the upset shank of the hook away from the upper die. During the continued downward movement of the lower die the presser foot rises and the feed fingers are actuated to feed the work. After the work has been fed by the feeding fingers the presser foot again descends upon the work and holds it in position during the return movement of the feeding fingers. The operation of the mechanism for supplying the raceway with hooks and the manner in which the holder for holding the hooks in the lower die is actuated will be clearly understood from the description already given. The hook setting and feeding devices and the work feeding devices continue to operate so long as the bell crank 60 is held in the position to which it was rocked by the treadle connected with the rod 61. As soon as the desired number of hooks have been set the treadle is released by the operator and the lever 67 is allowed to rise so that the cam shaft is disconnected from the main driving shaft at the end of its revolution. The shoe upper is then removed and its other side placed in position beneath the upper setting die. The bell crank 60 is then rocked in the opposite direction to cause the carrier of the lower die to be connected to its actuating mechanism so as to be moved toward and from the other raceway and the cam shaft is connected to the main driving shaft as before. The hook feeding and setting devices and the work feeding devices are then actuated as above described with the exception that the lower die is moved to take hooks from the other raceway.

It will be evident that in setting hooks upon one side of a shoe upper the top hook will be set first, and that in setting hooks upon the other side of the shoe upper the lowermost hook will be set first. The position for the top hook can be easily determined by the operator, but in order to determine the position of the lowermost hook I consider it preferable to provide a gage against which the top edge of the upper may be placed. This gage is indicated in Figs. 2 and 4 at 105 and is adjustably secured to the rear side of the block 81 by means of a clamping screw 106 passing through a slot in the gage.

Having thus indicated the nature and scope of my invention and having specifically described a machine embodying a preferred form thereof, I claim as new and desire to secure by Letters Patent of the United States.

1. A machine for setting lacing hooks, having, in combination, setting dies, and work feeding mechanism separate from the dies arranged to coöperate with the hooks after being set and feed the work, substantially as described.

2. A machine for setting lacing hooks, having, in combination, setting dies, a feed finger, and means for actuating the same to engage a hook after being set and feed the work, substantially as described.

3. A machine for setting lacing hooks, having, in combination, setting dies, a feed finger, a finger coöperating therewith, and means for actuating said fingers to grasp a hook after being set and feed the work, substantially as described.

4. A machine for setting lacing hooks, having, in combination, setting dies, a two-motion feed finger arranged to move in the line of feed, a four-motion finger coöperating therewith arranged to move in the line of feed and transversely thereto, and means for actuating said finger to grasp a hook after being set and feed the work, substantially as described.

5. A machine for setting lacing hooks, having, in combination, setting dies, a two-motion feed finger arranged to move in the line of feed, a four-motion finger coöperating therewith to grasp a hook after being set arranged to move in the line of feed and transversely thereto, a carrier upon which the four-motion finger is pivoted, a link connecting said fingers, and means for actuating the two-motion finger, substantially as described.

6. A machine for setting lacing hooks, having, in combination, setting dies, a two-motion feed finger arranged to move in the line of feed, a slide upon which said finger is mounted, means for actuating said slide, a four-motion feed finger coöperating with said two-motion finger to grasp a hook after being set arranged to move in the line of feed and transversely thereto, a frictionally mounted slide upon which said four-motion finger is pivoted, and a link connecting said finger and the slide upon which the two-motion finger is mounted, substantially as described.

7. A machine for setting lacing hooks, having, in combination, setting dies, a feed finger arranged to engage a hook after being set and feed the work, a reciprocating slide upon which said finger is mounted, and means for actuating said slide, substantially as described.

8. A machine for setting lacing hooks, having, in combination, setting dies, a hopper, a raceway for the hooks leading therefrom, a hook lifting plate for selecting the hooks and delivering them to the raceway, means for moving the plate toward and from the raceway, a clearing device located at the entrance of the raceway, and means for actuating the clearing device while the plate is moved away from the raceway to dislodge hooks left at the entrance of the raceway, substantially as described.

9. A machine for setting lacing hooks, having, in combination, setting dies, a hopper, a raceway for the hooks leading therefrom, means for delivering hooks to the raceway, a clearing device located at the entrance of the raceway, mechanism for actuating the clearing device, and a spring interposed between the clearing device and its actuating mechanism, substantially as described.

10. A machine for setting lacing hooks, having, in combination, setting dies, a hopper, a raceway for the hooks leading therefrom, means for delivering hooks to the raceway, a clearing device located at the entrance of the raceway and movable through the entrance of the raceway into the hopper and beyond the end of the raceway, and means for actuating the clearing device to dislodge hooks left at the entrance of the raceway, substantially as described.

11. A machine for setting lacing hooks, having, in combination, setting dies, a hopper, a raceway for the hooks leading therefrom, a hook lifting plate provided with a hook supporting edge, means for moving the plate to move the hook supporting edge into and out of line with the raceway, a clearing device located at the entrance of the raceway, and connections between the plate and clearing device for actuating the clearing device to dislodge hooks left at the entrance of the raceway, substantially as described.

12. A machine for setting lacing hooks, having in combination, setting dies, a hopper, a raceway for the hooks leading therefrom, means for delivering hooks to the raceway, a clearing device located at the entrance of the raceway, a rock shaft upon which the clearing device is mounted, a spring interposed between the rock shaft and clearing device, and means for actuating the rock shaft, substantially as described.

13. A machine for setting lacing hooks, having, in combination, setting dies, a hopper, a raceway for the hooks leading therefrom, a hook lifting plate provided with a rib to enter the space between the body portion and the base of the hook and with a ledge located below the rib arranged to support the body portion of the hook and compel the hook to assume a certain angular position, and means for moving the plate into a position to deliver the hooks supported thereby to the raceway, substantially as described.

14. A machine for setting lacing hooks, having, in combination, a hook setting die, a yieldingly mounted die coöperating therewith constructed to receive the body portion of a hook, a raceway arranged to feed a hook with its body portion in position to be received by the yieldingly mounted die, and means for actuating the yieldingly mounted die to take a hook from the raceway, substantially as described.

15. A machine for setting lacing hooks, having, in combination, an upper hook setting die, a yieldingly mounted lower die coöperating therewith constructed to receive the body portion of a hook, a raceway arranged to feed a hook with its body portion in position to be received by the lower die, and means for moving the lower die from a position in line with the upper die to a position beneath the hook in the raceway, then vertically to take the hook from the raceway, and then to a position to coöperate with the upper die in setting the hook, substantially as described.

16. A machine for setting lacing hooks, having, in combination, a hook setting die, a die coöperating therewith constructed to receive the body portion of a hook, a raceway arranged to feed a hook and hold the hook with its body portion in position to be received by said die, a holding device for holding a hook in said die, means for actuating said die to engage a hook while held in the raceway and to remove the hook from the raceway, and means for actuating the holding device to allow said die to receive the hook, substantially as described.

17. A machine for setting lacing hooks, having, in combinatioin, a hook setting die, a die coöperating therewith constructed to receive the body portion of a hook, and allow the hook to be removed in the direction of the axis of the die, a holding device for holding a hook in said die, and means for moving the holding device out of its holding position, substantially as described.

18. A machine for setting lacing hooks, having, in combination, a stationary die, a movable die, work feeding mechanism, a presser foot, separate from the work feeding mechanism and means for actuating the presser foot to allow the work to move toward the stationary die during the setting operation, substantially as described.

19. A machine for setting lacing hooks, having, in combination, a stationary die, a movable die, work feeding mechanism, a presser foot separate from the work feeding mechanism, and means for actuating the presser foot to move the work away from the stationary die after the setting operation and prior to the feeding of the work, substantially as described.

20. A machine for setting lacing hooks, having, in combination, a hook setting die, a die coöperating therewith constructed to receive the body portion of the hook, and provided with a surface stationary with respect to the die to support the collar or base of the hook, and a pivotally mounted holding device provided with a projection arranged to extend over the body portion of the hook and hold the hook in the die, substantially as described.

21. A machine for setting lacing hooks, having, in combination, a die provided with a surface at its end stationary with respect to the die to support the collar of a hook and with a recess in its side to receive the body portion of the hook, and a holding device provided with a projection arranged to extend over the body portion of the hook and hold the hook in the die, substantially as described.

22. A machine for setting lacing hooks, having, in combination, a hook setting die, a die coöperating therewith constructed to receive the body portion of a hook, a raceway arranged to feed a hook with its body portion in position to be received by said die, means for actuating said die to take a hook from the raceway and carry it to a position to be acted upon by the other die, and a holding device for holding the hook on the die mounted to move with the die, substantially as described.

23. A machine for setting lacing hooks, having, in combination, a pair of coöperating setting dies, a raceway for supplying hooks to the dies, means for actuating one of said dies to take a hook from the raceway and carry it to a position to be acted upon by the other die, and a guide arranged to engage the shank portion of the hook and press on the hook laterally to hold the hook in the die while the die is moving away from the raceway, substantially as described.

24. A machine for setting lacing hooks, having, in combination, an upper hook setting die, a lower die coöperating therewith constructed to receive the body portion of a hook, a raceway arranged to feed a hook with its body portion in position to be received by the lower die, means for moving the lower die from a position in line with the upper die to a position beneath the hook in the raceway, then vertically to engage the hook and then to a position to coöperate with the upper die in setting the hook, and a guide plate arranged to engage the shank portion of the hook and press on the hook laterally to hold the hook in the lower die while the die is moving away from the raceway, substantially as described.

25. A machine for setting lacing hooks, having, in combination, a pair of coöperating setting dies, a raceway for supplying hooks to the dies, means for moving one of said dies toward and from the raceway, a holding device for holding a hook in said die, means for actuating the holding device to allow said die to receive a hook and a guide arranged to hold a hook in the die while the die is moving away from the raceway, substantially as described.

26. A machine for setting lacing hooks, having, in combination, a pair of coöperating setting dies, one of which is constructed to receive the body portion of a hook, a raceway for supplying hooks to said die, means for moving said die toward and from the raceway, and a guide arranged to engage the shank portion of a hook and press on the hook laterally to hold the hook in the die while the die is moving away from the raceway, substantially as described.

27. A machine for setting lacing hooks, having, in combination, a pair of coöperating setting dies, a raceway for supplying hooks to the dies, means for actuating one of said dies to take a hook from the raceway and means actuated by the movement of said die for jarring the raceway, substantially as described.

28. A machine for setting lacing hooks, having, in combination, a pair of coöperating setting dies, a raceway for supplying hooks to the dies, means for actuating one of said dies to take a hook from the raceway, a hammer arranged to be moved away from the raceway by the movement of said die, and a spring for forcing the hammer against the raceway, substantially as described.

In testimony whereof I affix my signature, in presence of two witnesses.

HARRISON H. EATON.

Witnesses:
   FRED O. FISH,
   HORACE VAN EVEREN.

It is hereby certified that in Letters Patent No. 936,431, granted October 12, 1909, upon the application of Harrison H. Eaton, of Winchester, Massachusetts, for an improvement in "Machines for Setting Lacing Hooks or Studs," errors appear in the printed specification requiring correction, as follows: Page 2, line 82, after the reference-numeral "6," the word *and* should be inserted; page 3, line 71, the word "positions" should read *position*; same page, line 74, the word "are" should read *is*, and page 8, line 28, the word "finger" should read *fingers*; and that the said Letters Patent should be read with these corrections therein that the same may conform to the record of the case in the Patent Office.

Signed and sealed this 30th day of November, A. D., 1909.

[SEAL.]

E. B. MOORE,
*Commissioner of Patents.*